United States Patent [19]
Lecland et al.

[11] Patent Number: 5,844,566
[45] Date of Patent: Dec. 1, 1998

[54] METHOD AND APPARATUS FOR CONTROLLING SHADOW GEOMETRY ON COMPUTER DISPLAYS

[75] Inventors: Pascal Lecland, Rueil Malmaison; Antoine Balestriéri, Suresnes; Duy Minh Vu, Puteaux; André Clément, Palaiseau, all of France

[73] Assignee: Dassault Systemes, Suresnes, France

[21] Appl. No.: 601,430

[22] Filed: Feb. 12, 1996

[51] Int. Cl.$^6$ .................................................. G06F 15/00
[52] U.S. Cl. ............................................................ 345/426
[58] Field of Search ................................... 345/418, 419, 345/425, 426, 428, 147, 150, 429

[56] References Cited

U.S. PATENT DOCUMENTS

| | | | |
|---|---|---|---|
| 4,785,399 | 11/1988 | Evans et al. | 364/300 |
| 4,845,643 | 7/1989 | Clapp | 364/518 |
| 4,855,939 | 8/1989 | Fitzgerald, Jr. et al. | 364/522 |
| 4,984,180 | 1/1991 | Wada et al. | 364/518 |
| 5,006,991 | 4/1991 | Ohcoshi et al. | 364/474.2 |
| 5,010,502 | 4/1991 | Diebel et al. | 364/522 |
| 5,123,087 | 6/1992 | Newell et al. | 395/155 |
| 5,138,697 | 8/1992 | Yamamoto et al. | 395/120 |
| 5,198,990 | 3/1993 | Farzan et al. | 364/560 |
| 5,251,268 | 10/1993 | Colley et al. | 382/14 |
| 5,297,241 | 3/1994 | Hirr, Jr. et al. | 395/127 |
| 5,299,307 | 3/1994 | Young | 395/161 |
| 5,367,622 | 11/1994 | Coggins | 395/155 |
| 5,371,845 | 12/1994 | Newell et al. | 395/155 |
| 5,377,313 | 12/1994 | Scheibl | 395/122 |
| 5,383,395 | 1/1995 | Tokumasu et al. | 395/141 |
| 5,390,294 | 2/1995 | Takeuchi | 395/155 |
| 5,396,565 | 3/1995 | Asogawa | 382/14 |
| 5,412,762 | 5/1995 | Kondo | 395/120 |
| 5,425,109 | 6/1995 | Saga et al. | 382/187 |
| 5,444,836 | 8/1995 | Hollingsworth et al. | 395/135 |
| 5,461,709 | 10/1995 | Brown | 395/155 |
| 5,463,722 | 10/1995 | Venolia | 395/133 |
| 5,465,324 | 11/1995 | Lee et al. | 395/133 |
| 5,490,241 | 2/1996 | Mallgren et al. | 395/140 |
| 5,566,283 | 10/1996 | Modegi et al. | 395/126 |

FOREIGN PATENT DOCUMENTS

| | | |
|---|---|---|
| 0697679 | 4/1995 | European Pat. Off. . |
| 2292657 | 2/1996 | United Kingdom . |

OTHER PUBLICATIONS

C. Clarke, "Bravo New World–Schlumberger AG's CAD–CAM System", CADCAM, vol. 11 pp. 17(3), Nov. 1992.
Schwartz D., "Modeling Made Easy:HP's ME30 Software Allows Leviton Manufacturing to get Over the Hump", HP Professional, vol. 8, pp. 24(2), Apr. 1994.
Luzadder W., "Fundamentals of Engineering Drawing", pp. 85–86, 1991.
Kanai, et al., "Generation of Free–Form surface Modeles by Understanding Geometric and Topological Constraints of Rough Sketches", Systems Engineering, 1992 International.
Newton, "Tips & Techniques", Apple Computers, Inc. 1993.
Newton, MessagePad 100 Setup and Handwriting Guide, Apple Computer, Inc. 1994.
Newton, "MessagePad Handbook", 1993.
H. Samet, "The Design and Analysis of Spatial Data Structures", pp. 1–151, 1991.

*Primary Examiner*—Phu K. Nguyen
*Attorney, Agent, or Firm*—Blakely, Sokoloff, Taylor & Zafman LLP

[57] ABSTRACT

A method and apparatus for controlling shadow geometry on a computer display in an interactive computer display system. The method and apparatus comprises: maintaining primary element information defining a primary element; generating shadow geometry information defining a shadow geometry, the shadow geometry information having a predetermined mathematical relationship with the primary element, the shadow geometry information being generated in response to user manipulation of the primary element; integrating the shadow geometry with the primary element to form a single graphical unit (called a "par"); and selectively displaying the secondary element concurrently with the primary element.

21 Claims, 9 Drawing Sheets

| | CLASSES OF SURFACES ELEMENTS {230} | SHADOW GEOMETRY {240} | LIST OF SHADOW ELEMENTS |
|---|---|---|---|
| ANY SURFACE | | | 3 PLANES<br>3 LINES<br>1 POINT |
| PRISMATIC SURFACE (LIMITED) | | | DIRECTION OF EXTRUSION D<br>2 LIMIT PLANES<br>2D SHADOW GEOMETRY OF THE BASE SECTION |
| SURFACE OF REVOLUTION (LIMITED) | | | SURFACE AXIS D<br>2 LIMIT POINTS<br>2 LIMIT PLANES |
| HELICODIAL SURFACE | | | SURFACE AXIS D<br>A FAMILY OF POINTS LOCATED ON THE AXIS. THE DISTANCE BETWEEN EACH 2 POINTS IS THE STEP OF THE HELICOIDAL SURFACE |
| CYLINDRICAL SURFACE | | | AXIS D OF THE CYLINDER |
| PLANAR SURFACE | | | NORMAL VECTOR TO P |
| SPHERICAL SURFACE | | | POINT O CENTER OF THE SPHERE |

FIG. 2B

| | 0 | 1 | 2 | 3 | 4 | 5 | 6 | 7 |
|---|---|---|---|---|---|---|---|---|
| | | ANY SURFACE | (TD) PRISMATIC SURFACE | (ROD) SURFACE OF REVOLUTION | (HDP) HELICOIDAL SURFACE | (CD) CYLINDRICAL SURFACE | (GP) PLANAR SURFACE | (SO) SPHERICAL SURFACE |
| (CD) | | | | | | (CD) if D1=D2; (TD) if D1/D1 & D1≠D2; (E) else | (ROD) if P1⊥D2; (TD) if D2//P1; (E) else | (ROD) if O1=D2; (E) else |
| (GP) | | | | | | | (GP) if P1//P2; (TD) else | (ROD) |
| (SO) | | | | | | | | (ROD) if O1≠O2; (SO) if O1=O1 |

FIG. 5B

METHOD AND APPARATUS FOR CONTROLLING SHADOW GEOMETRY ON COMPUTER DISPLAYS

BACKGROUND OF THE INVENTION

1. Field of the Invention

The present invention relates to the field of displaying geometry on display devices. Specifically, the field is that of interactive display control devices used for drawing and manipulating graphic or textual geometry on a display screen.

2. Related Art

Interactive computer systems are commonly used for computer-aided design and drafting. These computer applications typically provide interactive controls for creating and manipulating geometry for display on a computer display screen. Several embodiments of these systems in the prior art are set forth below.

U.S. Pat. No. 5,371,845 issued on Dec. 6, 1994, to Ashlar, Incorporated of Sunnyvale, Calif. describes a system and method for the creation of graphic images including automatic pull-off creation and maintenance of tangent and perpendicular lines, creation and maintenance of objects satisfying mutual geometric relationships, the identification and processing of visual intersections, and alignment in three dimensional space. The Ashlar patent includes a description of the automatic recognition of interesting points, the use of screen messages to identify points, the use of a secondary cursor, the creation of temporary geometry, the examination of interesting points which arise from actual geometry, temporary geometry, and/or the interaction of actual and temporary geometry.

U.S. Pat. No. 5,123,087 issued Jun. 16, 1992, to Ashlar, Incorporated of Sunnyvale, Calif. describes a computer aided drafting system and method for automatically locating geometric points for a user. The disclosed method includes defining a type of geometric point which includes a point type of interest to the user, setting a hit radius, displaying an object, displaying a cursor to indicate a location, testing the object to find a point having the defined point type, which is within the hit radius of the cursor, and if a point is found then displaying the point.

U.S. Pat. No. 5,299,307 issued Mar. 29, 1994, to Claris Corporation of Santa Clara, Calif. discloses a method and apparatus for generating and manipulating graphic objects on a computer display screen. The disclosed system includes a graphic guide used for associating edges and points of one graphic image with one or more other images. The graphic guide operates in relation to the position of a cursor on the computer display screen. The graphic guide is displayed only so long as the cursor remains within a proximity region associated with a point on an object.

U.S. Pat. No. 5,465,324 issued Nov. 7, 1995, to Hewlett Packard Company of Palo Alto, Calif. discloses a computer aided design system providing a means for assisting the user in defining and editing geometric objects. The invention proposes several useful geometric relations between the cursor position and the already defined geometric object independent of the cursor position. For example, if an already defined circle is within a catch range of the cursor position, the system proposes to draw a line from the cursor position to the center of the circle, and proposes tangents from the cursor position to the circle. The disclosed invention also proposes to generate the geometric relation (design proposal) independent of the cursor position. Using the disclosed invention, relations between two geometric objects can be proposed regardless of the cursor position.

U.S. Pat. No. 5,463,722 issued Oct. 31, 1995, to Apple Computer, Incorporated of Cupertino, Calif. discloses a method and apparatus for automatic alignment of manipulated objects in two dimensional and three dimensional graphic space. The disclosed invention provides an alignment field gradient which emanates from objects surrounding the manipulated object(s). As a user manipulates an object, the disclosed invention attracts the manipulated object into an aligned position and orientation with another object(s) in the displayed three dimensional display space. The present invention provides alignment of all combinations adversities, edges, and planer faces for three dimensional polyhedral objects and for all combinations adversities and edges for two dimensional polygonal objects.

U.S. Pat. No. 5,297,241 issued Mar. 22, 1994, to Hewlett Packard Company of Palo Alto, Calif. discloses a method for automated re-layout of two dimensional drawings from a solid model wherein the solid model can be revised to incorporate design changes.

U.S. Pat. No. 5,461,709 issued Oct. 24, 1995, to Intergraph Corporation of Huntsville, Ala. discloses a system for establishing the location of data points in a model space represented in a view of a two dimensional display. In one embodiment, the system has a pointing device (such as a mouse) for establishing the location of a cursor on the display, and also an arrangement for establishing in the model space primary and secondary orientation planes of which one is currently active at any given time. On command (typically when the cursor is in a desired position) a tentative selection arrangement copies data for a current point to data for a tentative point and toggles an active plane from one to the other of the primary and secondary planes.

A number of disadvantages exist with the image control mechanisms existing in the prior art. First, the proposed or temporary geometry in much of the prior art is slaved to the cursor position or pointing device. In these systems, the temporary geometry is only visible when the cursor is in the proximity of the related portions of the permanent geometry. This restricts the utility of the temporary geometry. Secondly, prior art systems do not handle the temporary geometry as an integral part of the object to which it relates or the drawing of which it is a member. In other words, the prior art systems cannot treat the permanent and temporary geometry as one single object, which is permanently retained in a database at the same level as any permanent geometry or topology.

As will be discussed below, the present invention provides an improved computer-assisted design and drawing system which overcomes the disadvantages of the prior art systems.

SUMMARY OF THE INVENTION

A computer-aided design and drawing system having semantic-oriented shadow geometry is disclosed. The preferred embodiment comprises an interactive computer controlled display system, including a bus for interconnecting system components, a processor, a random access memory, an optional read-only memory, a data storage means for storing data, a display device including a display screen, an alphanumeric input device, a cursor control device for interactively positioning a cursor on the display screen, and a signal generation device or mouse button. In this interactive computer-controlled display system, a method and apparatus is disclosed for automatically generating and manipulating shadow geometry. The method and apparatus comprises: 1) maintaining primary element information defining a primary element; 2) generating secondary element information defining a secondary element, the secondary element having a predetermined relationship with the primary element, the secondary element information being generated in response to user manipulation of the primary element; and 3) selectively displaying the secondary element concurrently with the primary element.

It is an advantage of the present invention that shadow geometry related to true geometry be automatically and efficiently created or erased from a display screen and retained permanently in a database as part of a related object of true geometry. It is a further advantage of the present invention that manipulations of the true geometry be automatically applied to the related shadow geometry. It is a further advantage of the present invention that predetermined shadow geometry be automatically created and optionally displayed when an object of true geometry is created. It is a further advantage of the present invention that the displaying of the shadow geometry is not related to the position of a cursor or pointing device. It is a further advantage of the present invention that shadow geometry is also automatically created for multiple elements or objects in two-dimensional (2D) or three-dimensional (3D) space.

These and other features and advantages of the computer-aided design and drawing system of the present invention are described herein. The means and methods of the present invention are described in more detail in the detailed description that follows.

BRIEF DESCRIPTION OF THE DRAWINGS

FIGS. 2A–2B illustrate the primary and secondary geometry of the preferred embodiment.

FIGS. 5A and 5B illustrate each of the pairings of combined multiple primary objects and the resulting secondary geometry of the preferred embodiment.

DETAILED DESCRIPTION OF THE INVENTION

A computer-aided design and drawing system having semantic-oriented shadow geometry is disclosed. In the following description, specific displays, configurations, and methods are set forth in order to provide a thorough understanding of the present invention. However, it will be apparent to one of ordinary skill in the art that the present invention may be practiced without these specific details. In other instances, well known systems are shown in block diagram form in order not to obscure the present invention.

Figure 1:
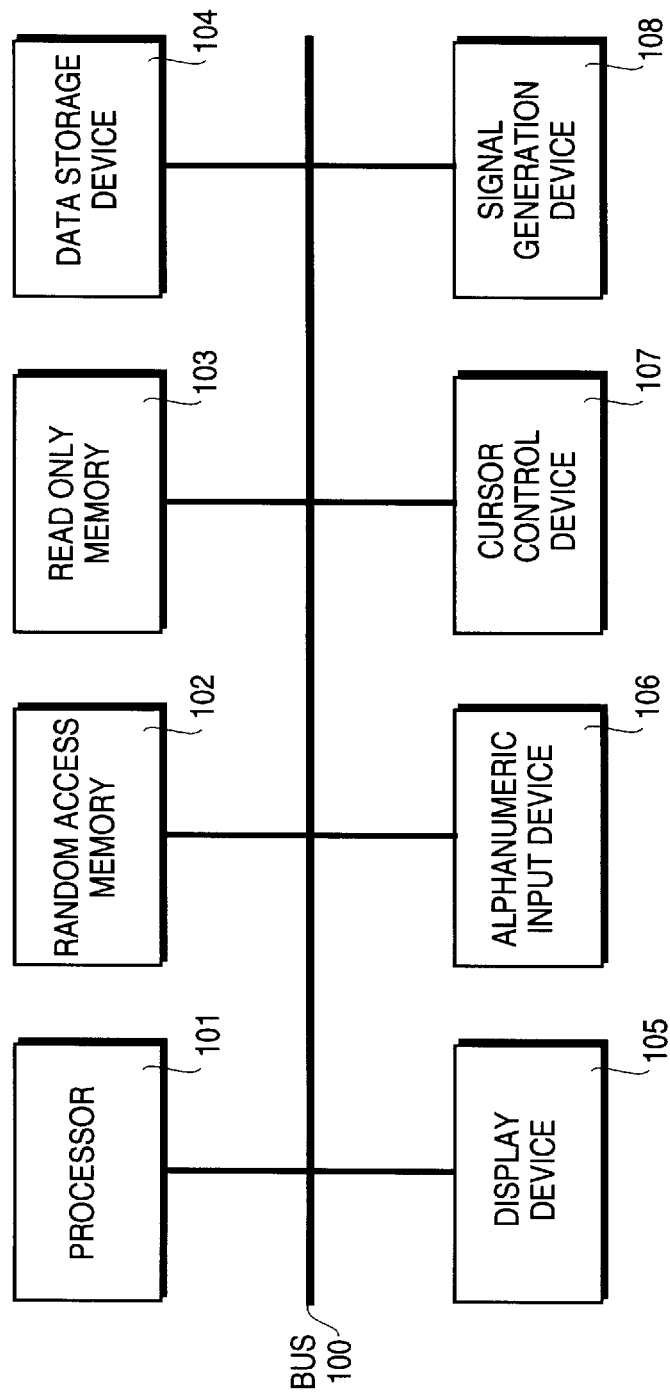
FIG. 1 is an illustration of a typical computer system architecture upon which the present invention may operate.

Referring now to FIG. 1, the computer system architecture of the preferred embodiment of the present invention is shown. This preferred embodiment is implemented on a conventional computer system. It is apparent to one of ordinary skill in the art that alternative conventional computer systems may be employed. In general, such systems as illustrated by FIG. 1 comprise a bus 100 for communicating information, a processor 101 coupled with the bus 100 for processing information, a random access memory 102 coupled with the bus 100 for storing information and instructions for the processor 101, an optional read-only memory 103 coupled with the bus 100 for storing static information and instructions for the processor 101, a data storage device 104 such as a magnetic disk and disk drive coupled with the bus 100 for storing information and instructions, a display device 105 coupled to the bus 100 for displaying information to the computer user, an alphanumeric input device 106 including alphanumeric and function keys coupled to the bus 100 for communicating information and command selections to the processor 101, a cursor control device 107 coupled to the bus 100 for communicating information and command selections to the processor 101, and a signal generation device 108 coupled to the bus 100 for communicating command selections to the processor 101.

The display device 105 may be a liquid crystal device (LCD), cathode ray tube (CRT), or other suitable display device. The cursor control device 107 allows the computer user to dynamically signal the two dimensional movement of a visible symbol on the display screen of the display device 105. Many implementations of the cursor control device are known in the art, including trackball, mouse, joystick, or special keys on the alphanumeric input device 106 capable of signaling movement in a given direction.

The computer-assisted design and drawing system of the present invention provides additional controls and enhancements for these computer systems. These features of the present invention are described in the following sections. The general operation of the computer system or cursor control device is described only where necessary to provide a thorough understanding of the present invention, since these methods are well known to those of ordinary skill in the art.

The computer assisted design and drawing system of the preferred embodiment provides an improved graphical user interface, with which a user may more effectively and quickly generate drawings in a computer environment. Prior art computer systems provide windowing capabilities and tools for drawing various types of objects or geometric shapes on the display screen. In the preferred embodiment, these tools are activated and used with a cursor control device or mouse using techniques known in the art. Once an object is drawn, however, the present invention provides additional features for assisting the user in drawing other objects or in placing, orienting, or studying a single object.

The main additional feature of the present invention is the automatic generation and display of shadow geometry. Shadow geometry is displayed imagery (i.e. secondary elements) useful for constructing a true drawing (i.e. primary drawing elements). The creation, orientation, and positioning of the primary drawing is facilitated by use of the shadow geometry. In general, the secondary elements have some mathematical or geometrical relationship to the corresponding primary elements. For example, the perpendicular or midpoint of a line segment can be identified using shadow geometry. The tangent or center of a circle or curve can also be identified using the shadow geometry.

Figure 2A:
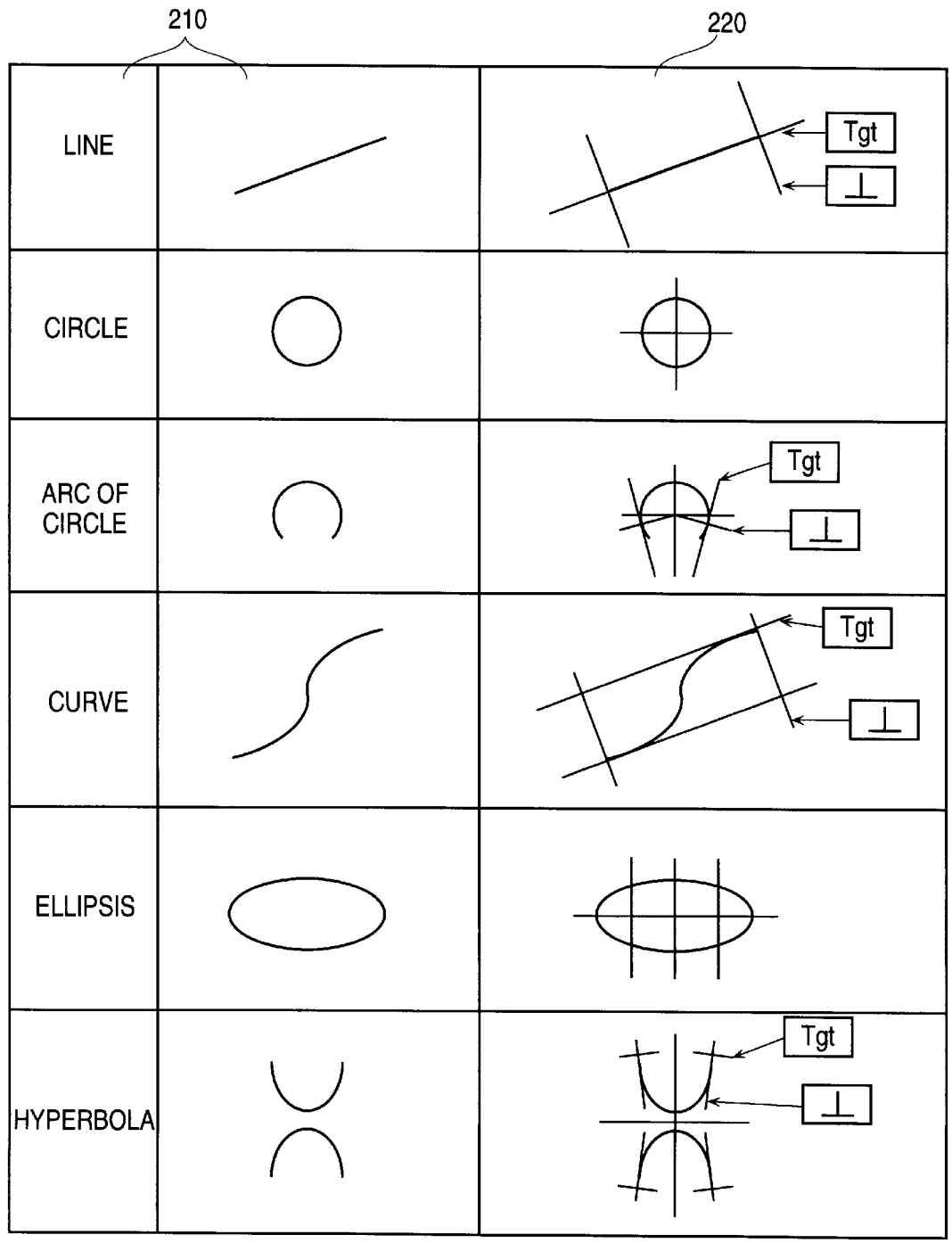

FIG. 2A illustrates the two-dimensional primary elements 210 and their corresponding secondary elements 220 provided in the preferred embodiment of the present invention. FIG. 2B illustrates the three-dimensional primary elements 230 and their corresponding secondary elements 240 provided in the preferred embodiment of the present invention.

It will be apparent to those of ordinary skill in the art that other types of secondary geometry will be apparent given a primary geometry. For example, the midpoint of a line segment or an angled secondary element at some angle other than perpendicular is within the scope of the present invention.

As shown in FIGS. 2A and 2B, each of the secondary elements 220 and 240 bear some mathematical or geometrical relationship to the corresponding primary geometry 210 and 230, respectively. For example, the shadow geometry 220 corresponding to the line primary element is a tangent line and two perpendicular lines at each endpoint of the line primary element. Similarly, the shadow geometry 220 of the circle primary element is a pair of perpendicular lines intersecting at the center of the circle primary element. In the three-dimensional case, shadow geometry 240 corresponding to a cylindrical solid element 230 is an axis line running perpendicular to the circular ends of the cylinder. Other relationships are supported as shown in FIGS. 2A and 2B for other types of two dimensional and three-dimensional primary elements. Note, however, that the definition of the shadow geometry is not dependent upon any information other than that provided by the primary element. Specifically, the shadow geometry is not defined by the primary element in combination with a cursor position or any other information external to the information related to the primary element. Thus, the information defining the shadow geometry is derived purely from a predetermined mathematical or geometrical relationship applied to the information related only to the primary element.

Prior art systems either require manual creation of shadow geometry or provide only temporary geometry displayed as the cursor control device is moved. The present invention, however, automatically creates shadow geometry as a primary element is created. The shadow geometry becomes an integral part of the primary geometry, yet a distinction between the shadow geometry and the primary geometry is still maintained. The effect of integrating the shadow geometry with the primary geometry means that the shadow geometry is automatically created, modified, re-oriented, re-positioned, erased/deleted, and imported whenever the corresponding primary geometry is created, modified, re-oriented, re-positioned, erased/deleted, or imported. Thus, the combination of the primary and automatically created secondary geometry provides an integrated unit that can be conveniently and quickly manipulated. Though integrated with the primary geometry, the secondary geometry can still be independently selectively displayed or suppressed, deleted, or selectively exported or not exported with a single command. The shadow geometry can also be separately selected using the cursor control device just as the primary geometry can be so selected.

The integration of the secondary and primary geometries into a single unit (called a par herein) produces several advantages. First, the user only needs to manipulate the primary geometry because the secondary geometry is automatically manipulated in a corresponding manner. Secondly, the display of the secondary geometry is not dependent on cursor movement. Thirdly, the user can define custom secondary geometry that is carried with the primary geometry. In short, the present invention establishes a semantic relationship between the primary and secondary elements of a par and between the par and other geometry in a drawing. These advantages are not available using the prior art drawing tools.

Figure 3:
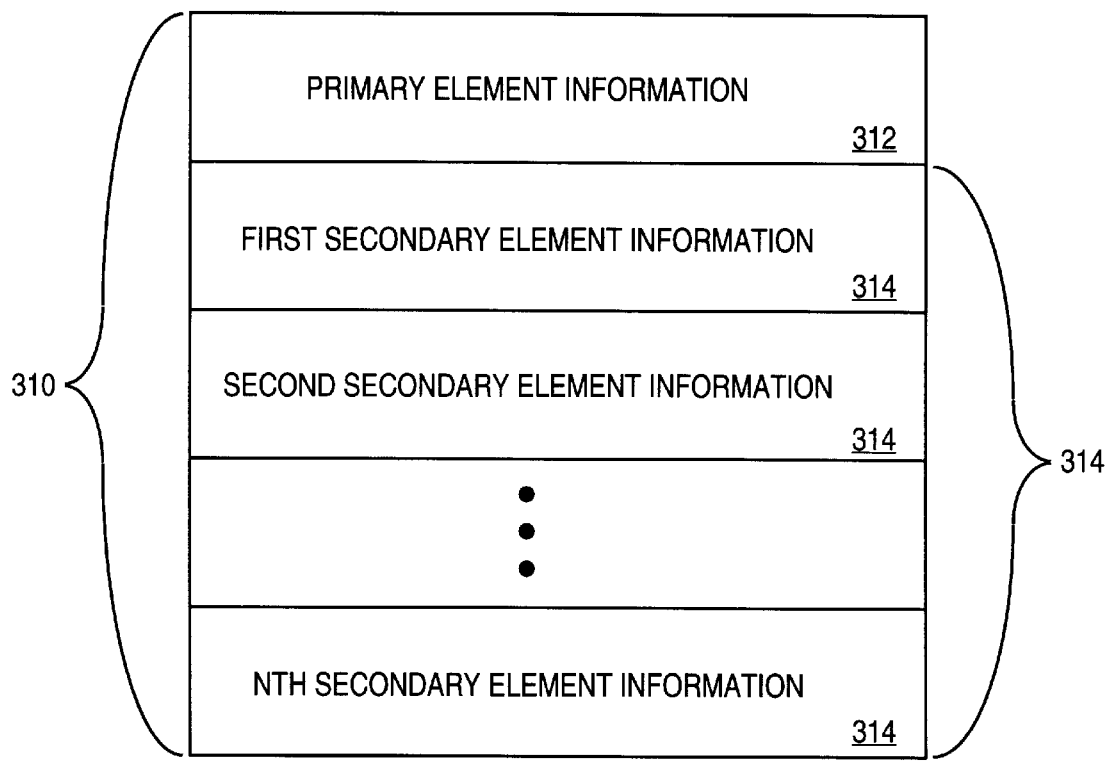
FIG. 3 illustrates a data structure storing information related to the primary and secondary geometry of the preferred embodiment.

Referring now to FIG. 3, a par data structure 310 is illustrated. As shown, a par is comprised of a primary element information portion 312 and a secondary element information portion 314. The secondary element information portion 314 includes a description of each of the secondary elements corresponding to the primary element 312. For example, if the primary element is a line segment, the primary element information 312 includes the X, Y location of each of the two endpoints of the two-dimensional line element or the X, Y, Z location of each of the two endpoints of the three-dimensional line element. The first secondary element information storage location in portion 314 would be used in this example for the storage of the X, Y location of each of the two endpoints of the two-dimensional secondary line element perpendicular to the primary line element and intersecting one of the endpoints of the primary line element. Alternatively, the X, Y, Z location of each of the two endpoints of the three-dimensional secondary line element perpendicular to the primary line element and intersecting one of the endpoints of the primary line element is stored in the first secondary element information location of portion 314. The second secondary element storage location is used in this example for storage of information defining the location of the perpendicular line segment intersecting the other endpoint of the primary line element. The third secondary element information block can be used to define the shadow line element tangent to the primary line element. It will be apparent to those of ordinary skill in the art that other secondary or shadow elements corresponding to the primary element can also be appended to the data structure illustrated in FIG. 3. It will also be apparent to those of ordinary skill in the art that the information specifying primary and secondary elements can be defined in various ways. For example, instead of defining the position of line segments in Cartesian coordinates, polar coordinates could equivalently be used. Also, other information related to an element, such as color, style, highlighting, fill, texture, etc. can also be included in the element information stored in data structure 310.

Using the data structure described above in connection with FIG. 3, the information stored in the secondary element information portion 314 can be conveniently initialized, modified, or deleted when the information of the corresponding primary element 312 is initialized, modified, or deleted. As will be described below in connection with the processing performed for the shadow geometry functionality of the present invention, the secondary element information portion 314 is updated when the information of the corresponding primary element 312 is updated.

Because of the integration of secondary geometry with primary geometry in a par, the present invention also supports shadow geometry associated with multiple primary elements in two-dimensions and in three-dimensions.

Figure 4A:
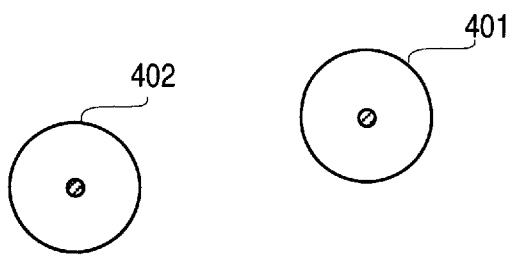
FIGS. 4A–4C illustrate an example of combining multiple primary objects and the resulting secondary geometry of the preferred embodiment.
Figure 4B:
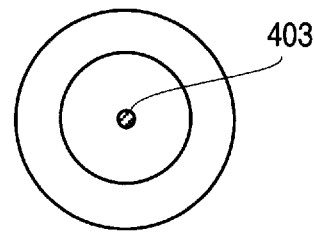
Figure 4C:
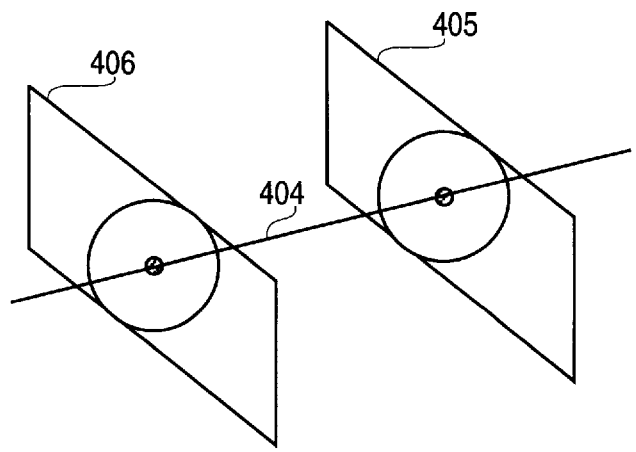

Referring to FIGS. 4A–4C and FIGS. 5A and 5B the creation of shadow geometry for multiple primary objects is illustrated. Shadow geometry for a combination of primary objects is created when a user explicitly combines two objects, such as when the user makes an assembly of a pair of two-dimensional objects or a pair of three-dimensional solids. Any combination operation is followed by a combination of shadow geometry. FIG. 4A illustrates two spheres 401 and 402 (i.e. multiple primary elements) which have not yet been combined by a user. FIGS. 4B and 4C illustrate two ways in which the user may combine the two spherical objects. In FIG. 4B, the two spherical primary objects 401 and 402 are combined by locating them on a common center 403. In this case, the combination is equivalent to a spherical surface and the resulting shadow geometry is a displayed center point 403. FIG. 4C illustrates the second way in which the user may combine the two spherical objects 401 and 402 in this example. In FIG. 4C, the two spherical primary objects 401 and 402 are combined but not with a common center. In this case, the combination is equivalent to a limited surface of revolution and the resulting shadow geometry is the axis 404 intersecting the centers of each sphere 401 and 402. In addition, the shadow geometry, in this case, includes the two planes 405 and 406 which are perpendicular to axis 404. This shadow geometry is created by the present invention is response to a user combination of spheres 401 and 402. It will be apparent to those of ordinary skill in the art that other types of objects may be combined and corresponding shadow geometry created in the same way shown in FIGS. 4A–4C.

Figure 5A:

Referring now to FIGS. 5A and 5B seven different types of primary objects are shown with the corresponding shadow geometry created for pairings of each of the seven different types of objects. The rules for generating shadow geometries for primary object pairs is commutative and deterministic. The seven different types of objects in the preferred embodiment are: 1) any surface, 2) prismatic surface, 3) surface of revolution, 4) helicoidal surface, 5) cylindrical surface, 6) plane surface, and 7) spherical surface. FIG. 5 shows the definition of the shadow geometry generated when an object type in the horizontal axis of the chart of FIG. 5 is combined with an object type in the vertical axis of the chart of FIG. 5. For example, the shadow geometry shown at the intersection of the seventh column (first sphere) with the seventh row (second sphere) represents the same two cases for combining two spheres as described in detail above in connection with FIGS. 4A–4C. Various cases for other pairings of objects and the corresponding shadow geometry is shown in FIGS. 5A and 5B.

The present invention includes computer program logic for the operation of an improved computer aided design and drawing system. This logic is described in the following section and in FIGS. 6–7. In addition to the computer resources described earlier, the present invention operates in conjunction with an operating system and system functions capable of displaying windows, graphical and textual information within windows, and other images on the display device. System functions for interfacing with the display control device and user input devices are also required. These resources are standard processing components known in the computer art.

When the processor in the computer system of the present invention is first powered up, the operating system logic receives control and initializes the system components, such as random access memory 102, the display device 105, cursor control device 107, signal generation device 108, and data storage device 104. At the end of its initialization cycle, or in response to a user command, the operating system displays a window and prompts a user to begin the input of the primary elements of a computer assisted drawing. The program logic associated with the shadow geometry functionality gets control when the user finishes drawing a primary element. It is apparent to those of ordinary skill in the art that other means for activating the features of the present invention are conceivable.

The shadow geometry functionality is initiated automatically (if so configured) by the operating system once the creation of a primary element is completed. When this occurs, the processing flow begins, as shown in FIG. 6 at the box labeled Processing Logic for Creating a Par.

Figure 6:
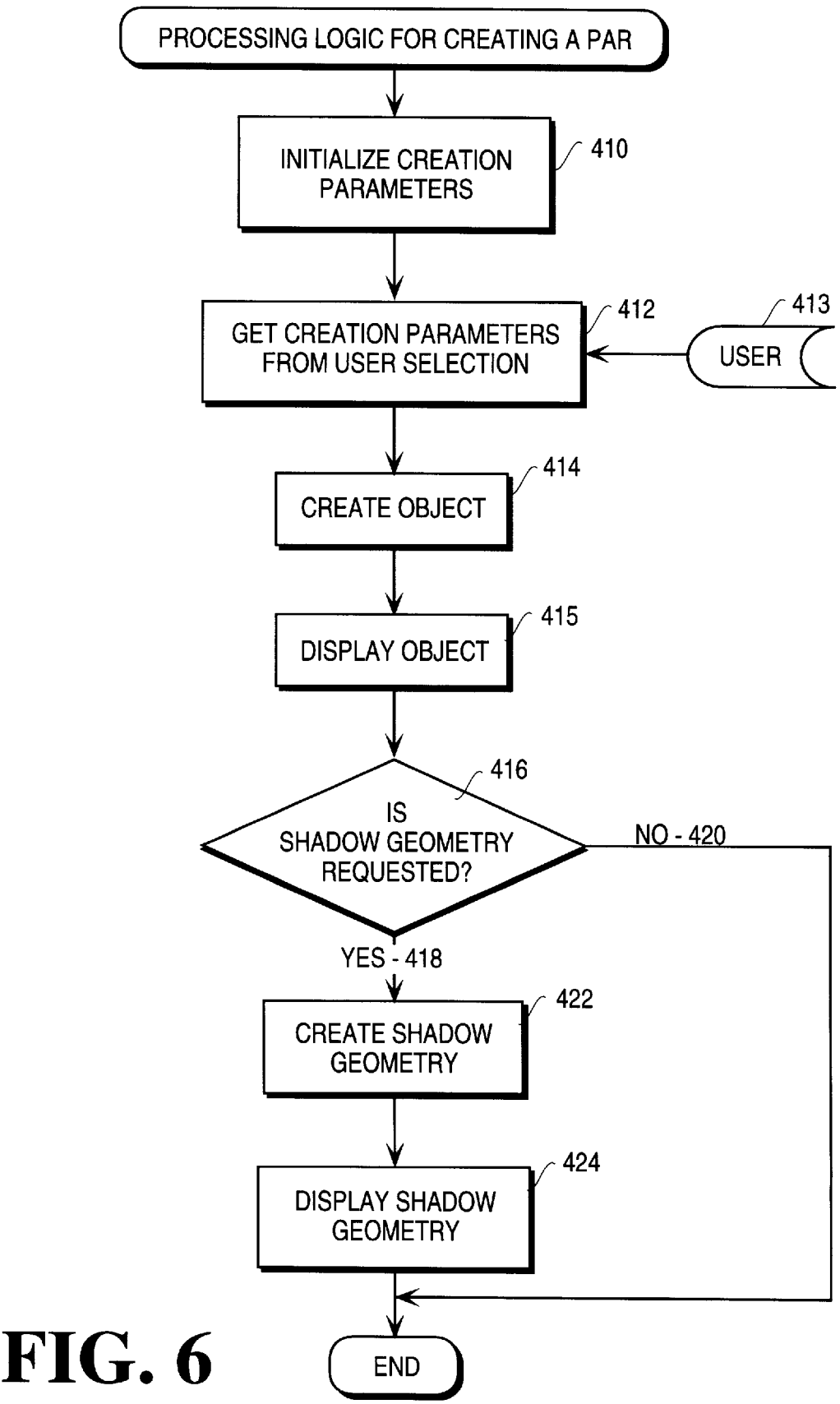
FIGS. 6–7 are flowcharts illustrating the processing logic of the present invention.

Referring now to FIG. 6, par creation parameters are initialized in block 410. Next, object creation parameters are obtained from user input in block 412. These parameters include, for example, endpoints if the user is creating a line, a center point if the user is creating a circle, etc. The object is created using the input parameters in block 414 and displayed after execution of block 415. If shadow geometry is selected by previous configuration, the shadow geometry corresponding to the displayed object type is created in block 422 and displayed after execution of block 424. If shadow geometry is not selected, path 420 is taken and execution terminates at the end bubble shown in FIG. 6.

Figure 7:
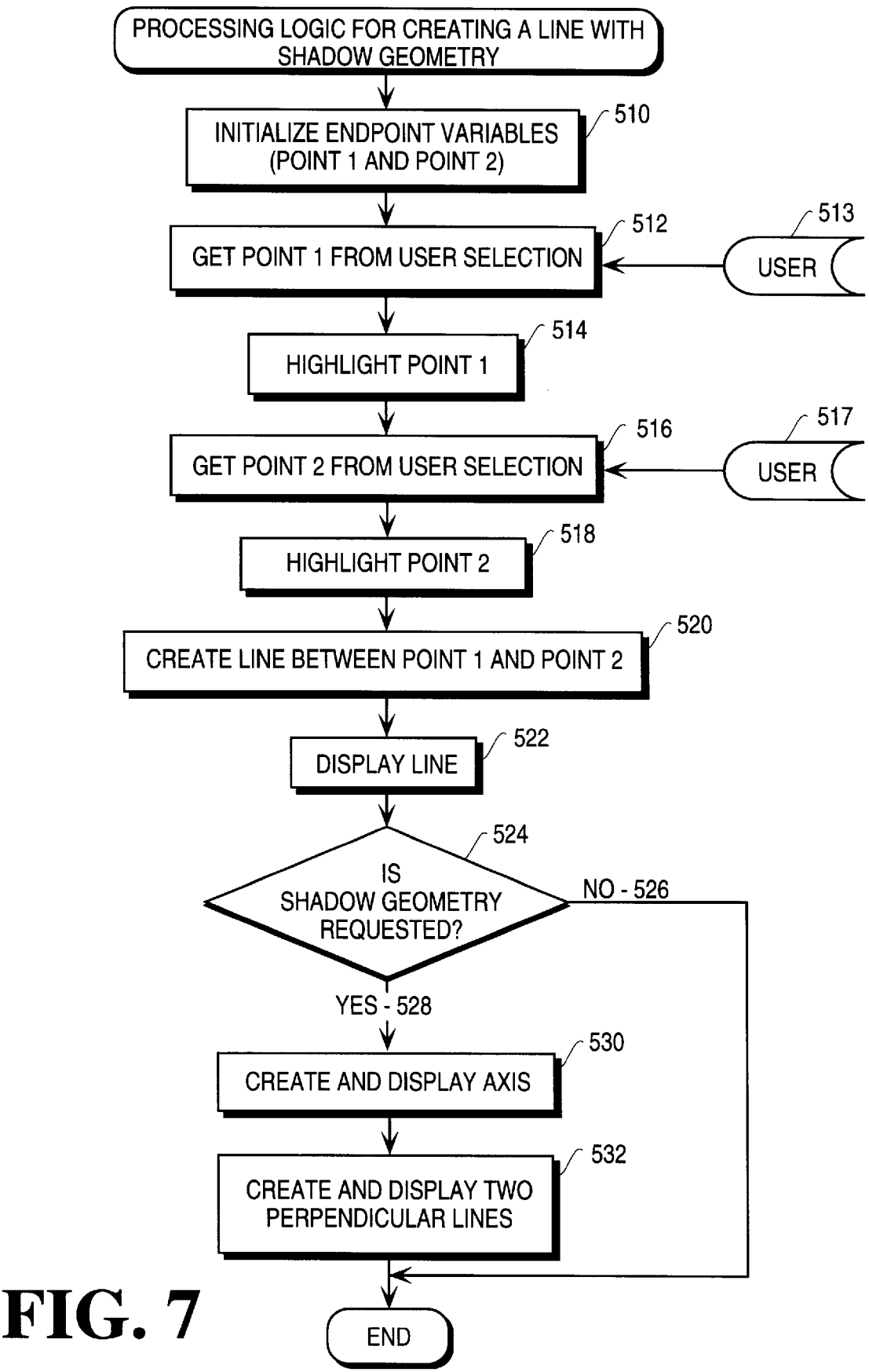

Referring now to FIG. 7, an example shows the processing logic for creating a line object with corresponding shadow geometry. In block 510, the endpoint variables for the line object are initialized. The first endpoint (Point 1) is obtained from a user in block 512. Point 1 is highlighted on the display screen in block 514. The second endpoint (Point 2) is obtained from user input in block 516. Point 2 is highlighted on the display screen in block 518. A line is created between Point 1 and Point 2 (block 520). The line is displayed after execution of block 522. If shadow geometry is selected by previous configuration, an axis is created and displayed in block 530. Next, the shadow geometry corresponding to a line object type (i.e. two perpendicular lines) is created in block 532 and displayed after execution of block 532. If shadow geometry is not selected, path 526 is taken and execution terminates at the end bubble shown in FIG. 7.

Although this invention has been shown in relation to a particular embodiment, it should not be considered so limited. Rather, it is limited only by the appended claims.

What is claimed is:

1. In an interactive computer-controlled display system, a method for automatically generating and manipulating shadow geometry, said method comprising the steps of:
   maintaining primary element information defining a primary element;
   generating shadow geometry information defining said shadow geometry, said shadow geometry information having a predetermined mathematical relationship with said primary element, said shadow geometry information being generated in response to user manipulation of said primary element;
   integrating said shadow geometry with said primary element to form a single graphical par unit, and selectively displaying said graphical par unit.

2. The method as claimed in claim 1 wherein said primary element is a line.

3. The method as claimed in claim 1 wherein said primary element is a circle.

4. The method as claimed in claim 1 wherein said primary element is a curve.

5. The method as claimed in claim 1 wherein said primary element is a three-dimensional element.

6. The method as claimed in claim 1 wherein said primary element information and said shadow geometry information are stored in a common data structure.

7. The method as claimed in claim 1 wherein said shadow geometry is selectively erased while said primary element remains displayed.

8. In an interactive computer-controlled display system, a method for automatically generating and manipulating shadow geometry, said method comprising the steps of:
   maintaining primary element information defining a first primary element;
   maintaining primary element information defining a second primary element;

combining said first primary element and said second primary element;

generating shadow geometry information defining said shadow geometry, said shadow geometry information having a predetermined mathematical relationship with said combination of said first primary element and said second primary element, said shadow geometry information being generated in response to user manipulation of said combination of said first primary element and said second primary element;

integrating said shadow geometry with said primary and secondary elements to form a single graphical par unit; and selectively displaying said graphical par unit.

9. The method as claimed in claim 8 wherein said first primary element and said second primary element are two-dimensional elements.

10. The method as claimed in claim 8 wherein said first primary element and said second primary element are three-dimensional elements.

11. The method as claimed in claim 8 wherein said primary element information 25 and said shadow geometry information are stored in a common data structure.

12. The method as claimed in claim 8 wherein said shadow geometry is selectively erased while said combination of said first primary element and said second primary element remains displayed.

13. An interactive computer-controlled display apparatus for automatically generating and manipulating shadow geometry, said apparatus comprising:

means for maintaining primary element information defining a primary element;

means for generating shadow geometry information defining said shadow geometry, said shadow geometry having a predetermined mathematical relationship with said primary element, said shadow geometry information being generated in response to user manipulation of said primary element;

means for integrating said shadow geometry with said primary element to form a single graphical par unit; and means for selectively displaying said graphical par unit.

14. The apparatus as claimed in claim 13 wherein said primary element is a two-dimensional element.

15. The apparatus as claimed in claim 13 wherein said primary element is a three-dimensional element.

16. The apparatus as claimed in claim 13 wherein said primary element information and said shadow geometry information are stored in a common data structure.

17. The apparatus as claimed in claim 13 wherein said shadow geometry is selectively erased while said primary element remains displayed.

18. An interactive computer-controlled display apparatus for automatically generating and manipulating shadow geometry, said apparatus comprising:

means for maintaining primary element information defining a first primary element, means for maintaining primary element information defining a second primary element;

means for combining said first primary element and said second primary element;

means for generating shadow geometry information defining said shadow geometry, said shadow geometry information having a predetermined relationship with said combination of said first primary element and said second primary element, said shadow geometry information being generated in response to user manipulation of said combination of said first primary element and said second primary element;

integrating said shadow geometry with said primary and secondary geometry to form a single graphical par unit, and means for selectively displaying said graphical par unit.

19. The apparatus as claimed in claim 18 wherein said first primary element and said second primary element are two-dimensional elements.

20. The apparatus as claimed in claim 18 wherein said first primary element and said second primary element are three-dimensional elements.

21. The apparatus as claimed in claim 18 wherein said primary element information and said shadow geometry information are stored in a common data structure.

* * * * *